US011878435B2

(12) United States Patent
Khubani et al.

(10) Patent No.: US 11,878,435 B2
(45) Date of Patent: Jan. 23, 2024

(54) PORTABLE SHAVING APPARATUS

(71) Applicant: Church & Dwight Co., Inc., Princeton, NJ (US)

(72) Inventors: Anand Khubani, Morristown, NJ (US); Eric Langberg, Milford, PA (US); David Stowers, Morristown, NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 0 days.

(21) Appl. No.: 17/873,944

(22) Filed: Jul. 26, 2022

(65) Prior Publication Data

US 2023/0173699 A1 Jun. 8, 2023

Related U.S. Application Data

(63) Continuation of application No. 16/863,680, filed on Apr. 30, 2020, now Pat. No. 11,400,609, which is a continuation of application No. 16/501,895, filed on Jun. 29, 2019, now Pat. No. 10,870,211, which is a continuation of application No. 16/501,436, filed on Apr. 16, 2019, now Pat. No. 10,391,649, which is a continuation of application No. 15/732,616, filed on Dec. 4, 2017, now Pat. No. 10,300,619.

(60) Provisional application No. 62/482,111, filed on Apr. 5, 2017.

(51) Int. Cl.

| | |
|---|---|
| ***B26B 19/38*** | (2006.01) |
| ***B26B 19/46*** | (2006.01) |
| ***B26B 19/14*** | (2006.01) |
| ***A47K 7/02*** | (2006.01) |

(52) U.S. Cl.
CPC ............ *B26B 19/3853* (2013.01); *A47K 7/02* (2013.01); *B26B 19/14* (2013.01); *B26B 19/3813* (2013.01); *B26B 19/3826* (2013.01); *B26B 19/3833* (2013.01); *B26B 19/46* (2013.01); *B26B 19/3873* (2013.01); *B26B 19/3886* (2013.01)

(58) Field of Classification Search
CPC . B26B 19/3853; B26B 19/14; B26B 19/3813; B26B 19/3833; B26B 19/46; A47K 7/02
See application file for complete search history.

(56) References Cited

U.S. PATENT DOCUMENTS

| | | | |
|---|---|---|---|
| 2,279,682 | A | 4/1942 | Jackson |
| 2,720,696 | A | 10/1955 | Wadsworth |
| D190,785 | S | 6/1961 | Kruck |
| D191,448 | S | 10/1961 | Veersema |

(Continued)

FOREIGN PATENT DOCUMENTS

| | | | |
|---|---|---|---|
| CN | 300831331 | | 9/2008 |
| CN | 201132325 | Y | 10/2008 |

(Continued)

OTHER PUBLICATIONS

Finishing Touch Flawless Brows, www.amazon.com, p. 1 (Year:2018).

(Continued)

*Primary Examiner* — Joseph L Williams
(74) *Attorney, Agent, or Firm* — Womble Bond Dickinson (US) LLP

(57) ABSTRACT

The present invention provides for a shaving device and more specifically, to a portable shaving apparatus designed to look like a cosmetic container.

18 Claims, 7 Drawing Sheets

(56) References Cited

U.S. PATENT DOCUMENTS

| | | | |
|---|---|---|---|
| 3,116,551 | A | 1/1964 | Anton |
| 3,392,443 | A | 7/1968 | Kawano et al. |
| D216,383 | S | 12/1969 | Fischer |
| D231,809 | S | 6/1974 | Fujishima |
| D255,166 | S | 5/1980 | Ayukawa et al. |
| 4,227,301 | A | 10/1980 | Van Hemmen et al. |
| D258,701 | S | 3/1981 | McQueen |
| 4,332,321 | A | 6/1982 | Wratschko |
| D279,930 | S | 7/1985 | George |
| D283,059 | S | 3/1986 | Satoh et al. |
| D305,162 | S | 12/1989 | Mockovak |
| D305,806 | S | 1/1990 | Fujisawa |
| D307,491 | S | 4/1990 | Okada |
| 4,912,845 | A | 4/1990 | Inoue |
| 5,012,576 | A | 5/1991 | Johannesson |
| 5,135,406 | A | 8/1992 | Ishikawa |
| D368,984 | S | 4/1996 | Nakashima et al. |
| 5,625,950 | A | 5/1997 | Sterk et al. |
| 5,687,481 | A | 11/1997 | De Boer et al. |
| D400,303 | S | 10/1998 | Tanaka et al. |
| D416,355 | S | 11/1999 | Lerolle |
| D424,746 | S | 5/2000 | Lee |
| 6,272,752 | B1 | 8/2001 | Pino |
| 6,378,210 | B1 | 4/2002 | Bickford |
| 6,502,309 | B2 | 1/2003 | De Vries et al. |
| D473,974 | S | 4/2003 | Fuller |
| D478,690 | S | 8/2003 | Sgariboldi |
| D479,017 | S | 8/2003 | Sgariboldi |
| D485,013 | S | 1/2004 | Leventhal et al. |
| D488,260 | S | 4/2004 | Khubani |
| D497,035 | S | 10/2004 | Khubani |
| D503,495 | S | 3/2005 | Maeda |
| D513,092 | S | 12/2005 | Ajootian |
| D514,257 | S | 1/2006 | Bokelman-Dumas |
| D516,245 | S | 2/2006 | Ohta et al. |
| 7,152,323 | B1 | 12/2006 | Lin |
| D536,135 | S | 1/2007 | Kitagawa |
| D561,941 | S | 2/2008 | Khubani |
| 7,401,406 | B2 | 7/2008 | Morisugi et al. |
| D585,601 | S | 1/2009 | Althoff et al. |
| 7,497,218 | B2 | 3/2009 | Gueret |
| 7,669,605 | B2 | 3/2010 | Cho |
| D617,050 | S | 6/2010 | Lou |
| D617,051 | S | 6/2010 | Pires et al. |
| D632,014 | S | 2/2011 | Lee |
| D634,067 | S | 3/2011 | Stowers et al. |
| D634,068 | S | 3/2011 | Stowers et al. |
| D637,759 | S | 5/2011 | Byun |
| D651,746 | S | 1/2012 | Prat-Pfister |
| D652,990 | S | 1/2012 | Strickland |
| D663,483 | S | 7/2012 | Lee |
| D672,504 | S | 12/2012 | Lyles |
| D673,325 | S | 12/2012 | Martines |
| D674,144 | S | 1/2013 | Yamamoto et al. |
| D674,145 | S | 1/2013 | Ino |
| D674,558 | S | 1/2013 | Ino |
| D675,377 | S | 1/2013 | Boulanger |
| D675,778 | S | 2/2013 | Vetu |
| D675,779 | S | 2/2013 | Vetu et al. |
| 8,484,849 | B2 | 7/2013 | Morisugi et al. |
| 8,484,850 | B2 | 7/2013 | Morisugi et al. |
| 8,563,904 | B2 | 10/2013 | Cho |
| D693,060 | S | 11/2013 | Lyles |
| D695,962 | S | 12/2013 | Prat-Pfister et al. |
| D696,461 | S | 12/2013 | Prat-Pfister et al. |
| D698,491 | S | 1/2014 | Ellison et al. |
| D701,346 | S | 3/2014 | Hefetz et al. |
| D704,066 | S | 5/2014 | De Lima Paschoal et al. |
| 8,726,528 | B2 | 5/2014 | Lyles |
| 8,732,964 | B2 | 5/2014 | Fischer et al. |
| D712,596 | S | 9/2014 | Lee et al. |
| D717,492 | S | 11/2014 | Kulshreshtha |
| D717,493 | S | 11/2014 | Kulshreshtha |
| 8,959,775 | B2 | 2/2015 | Yabuuchi et al. |
| D728,159 | S | 4/2015 | Szymanski |
| D728,160 | S | 4/2015 | Szymanski |
| 9,027,251 | B2 | 5/2015 | Schmitt et al. |
| 9,174,349 | B2 | 11/2015 | Schmitt |
| D757,363 | S | 5/2016 | Sugiyama |
| D758,015 | S | 5/2016 | Prat-Pfister |
| D758,017 | S | 5/2016 | Smith |
| D758,663 | S | 6/2016 | Van Maanen |
| D758,664 | S | 6/2016 | Van Maanen |
| 9,364,960 | B2 | 6/2016 | Ohara et al. |
| D761,586 | S | 7/2016 | Kulshreshtha |
| D776,877 | S | 1/2017 | Zadro |
| D777,375 | S | 1/2017 | Frankel |
| D779,124 | S | 2/2017 | Houyoux |
| D781,496 | S | 3/2017 | Butler et al. |
| D785,871 | S | 5/2017 | Staab et al. |
| 9,743,738 | B2 | 8/2017 | Sanchez-Martinez et al. |
| D797,377 | S | 9/2017 | Reggiani et al. |
| D803,480 | S | 11/2017 | Wong |
| 9,821,478 | B2 | 11/2017 | Kleine Doepke et al. |
| D812,301 | S | 3/2018 | Tan |
| D818,646 | S | 5/2018 | Szymanski et al. |
| D821,204 | S | 6/2018 | Reggiani et al. |
| D828,628 | S | 9/2018 | Mori et al. |
| D830,634 | S | 10/2018 | Gamble et al. |
| D834,253 | S | 11/2018 | Khubani et al. |
| D834,254 | S | 11/2018 | Khubani et al. |
| D836,840 | S | 12/2018 | Khubani et al. |
| D841,246 | S | 2/2019 | Stowers |
| D841,247 | S | 2/2019 | Stowers |
| D841,887 | S | 2/2019 | Stowers |
| 10,300,619 | B2 | 5/2019 | Khubani et al. |
| D857,296 | S | 8/2019 | Khubani et al. |
| D857,297 | S | 8/2019 | Khubani et al. |
| 10,391,649 | B1 | 8/2019 | Khubani et al. |
| D865,291 | S | 10/2019 | Xiong |
| D868,373 | S | 11/2019 | Kling et al. |
| 2005/0028369 | A1 | 2/2005 | Cocchiarella et al. |
| 2005/0144783 | A1 | 7/2005 | Yiu |
| 2005/0241153 | A1 | 11/2005 | Koike |
| 2006/0156550 | A1 | 7/2006 | Beugels et al. |
| 2006/0156551 | A1 | 7/2006 | Khubani et al. |
| 2007/0277379 | A1 | 12/2007 | Okabe |
| 2008/0072430 | A1 | 3/2008 | Cafaro et al. |
| 2008/0250645 | A1 | 10/2008 | Tringali et al. |
| 2010/0095531 | A1 | 4/2010 | Akkerman et al. |
| 2011/0030220 | A1 | 2/2011 | Shimizu |
| 2011/0072668 | A1 | 3/2011 | Morisugi et al. |
| 2011/0094106 | A1 | 4/2011 | Kling et al. |
| 2011/0232096 | A1 | 9/2011 | Yabuuchi et al. |
| 2013/0212885 | A1 | 8/2013 | Lyles |
| 2013/0291390 | A1 | 11/2013 | Gajria et al. |
| 2014/0130642 | A1 | 5/2014 | Rodriquez |
| 2014/0157957 | A1 | 6/2014 | Mimura et al. |
| 2014/0230257 | A1 | 8/2014 | Eagleton et al. |
| 2015/0246454 | A1 | 9/2015 | Mintz et al. |
| 2016/0101529 | A1 | 4/2016 | Wind |
| 2016/0143410 | A1 | 5/2016 | Stampe et al. |
| 2016/0176060 | A1 | 6/2016 | Kulshreshtha |
| 2017/0106547 | A1 | 4/2017 | Lau |
| 2017/0144317 | A1 | 5/2017 | Shimizu |
| 2017/0165853 | A1 | 6/2017 | Li et al. |
| 2017/0203450 | A1 | 7/2017 | Hitson |
| 2017/0258198 | A1 | 9/2017 | Steeman et al. |
| 2017/0266824 | A1 | 9/2017 | Veldhuis et al. |
| 2018/0071927 | A1 | 3/2018 | Kleine Doepke et al. |
| 2018/0290318 | A1 | 10/2018 | Khubani et al. |
| 2018/0326603 | A1 | 11/2018 | Moss |
| 2018/0333875 | A1 | 11/2018 | Lau |
| 2019/0320778 | A1 | 10/2019 | Moon |

FOREIGN PATENT DOCUMENTS

| | | |
|---|---|---|
| CN | 301688539 | 9/2011 |
| CN | 301903889 | 5/2012 |
| CN | 302125081 | 10/2012 |
| CN | 202943656 | 5/2013 |
| CN | 203471807 | 3/2014 |
| CN | 203471808 | 3/2014 |
| CN | 203636849 | 6/2014 |

(56) References Cited

FOREIGN PATENT DOCUMENTS

| | | |
|---|---|---|
| CN | 102848408 | 4/2015 |
| CN | 303457621 | 11/2015 |
| CN | 303482791 | 12/2015 |
| CN | 103433945 | 2/2016 |
| CN | 205363974 | 7/2016 |
| CN | 304185953 | 6/2017 |
| CN | 304186004 | 6/2017 |
| CN | 304334779 | 10/2017 |
| CN | 107379032 | 11/2017 |
| CN | 304416637 | 12/2017 |
| CN | 304446416 | 1/2018 |
| CN | 304457107 | 1/2018 |
| CN | 304501107 | 2/2018 |
| CN | 304506970 | 2/2018 |
| CN | 304516516 | 2/2018 |
| CN | 304621293 | 5/2018 |
| CN | 304644627 | 5/2018 |
| CN | 304700973 | 6/2018 |
| CN | 207639841 | 7/2018 |
| CN | 304739096 | 7/2018 |
| CN | 304814295 | 9/2018 |
| CN | 304883675 | 11/2018 |
| CN | 304964171 | 12/2018 |
| CN | 305077826 | 3/2019 |
| CN | 305449692 | 11/2019 |
| CN | 305583508 | 1/2020 |
| DE | 402017203423 | 1/2018 |
| EM | 001272488-0003 | 4/2011 |
| EM | 001272488-0004 | 4/2011 |
| EM | 001401533-000 | 3/2016 |
| EM | 004171247-000 | 9/2017 |
| EM | 004385656-000 | 1/2018 |
| EM | 004411981-000 | 4/2018 |
| EM | 006565495-000 | 6/2019 |
| EM | 006684940-000 | 8/2019 |
| GB | 6056436 | 3/2019 |
| IN | 313208-001-00 01 | 12/2019 |
| JP | D1189187 | 9/2003 |
| JP | D1189459 | 9/2003 |
| JP | D1437855 | 3/2012 |
| JP | D1504741 | 8/2014 |
| JP | D1504917 | 8/2014 |
| KR | 3020060050934 | 8/2007 |
| KR | 300913973 | 7/2017 |
| KR | 3020170039818 | 8/2017 |
| KR | 300922559 | 9/2017 |
| KR | 3020170041319 | 9/2017 |
| RU | 00094348 | 7/2015 |
| WO | WO D049067-001 | 6/1999 |
| WO | WO 2014/088496 | 6/2014 |
| WO | WO 2016/187812 | 12/2016 |

OTHER PUBLICATIONS www.freakinreviews.com Finishing Touch Flawless Review, 2 pages, downloaded May 29, 2018, posted on Mar. 8, 2017.

Decision of Invalidity of European Registered Community Design 004171247-0001, dated Apr. 12, 2018.

PORTABLE SHAVING APPARATUS

CROSS-REFERENCE TO RELATED APPLICATIONS

This application is a continuation of U.S. application Ser. No. 16/863,680, filed on Apr. 30, 2020 and which issued on Aug. 2, 2022 as U.S. Pat. No. 11,400,609, which is a continuation of U.S. application Ser. No. 16/501,895, filed on Jun. 29, 2019 and which issued on Dec. 22, 2020 as U.S. Pat. No. 10,870,211, which is a continuation of U.S. application Ser. No. 16/501,436 filed on Apr. 16, 2019 and which issued on Aug. 27, 2019 as U.S. Pat. No. 10,391,649, which is a continuation of U.S. application Ser. No. 15/732,616 filed on Dec. 4, 2017 and which issued on May 28, 2019 as U.S. Pat. No. 10,300,619, which claims priority from U.S. Provisional Application Ser. No. 62/482,111 filed on Apr. 5, 2017 and entitled "Portable Shaving Apparatus", these applications being incorporated by reference in their entirety herein.

BACKGROUND OF THE INVENTION

Field of the Invention

This invention relates to an article and more specifically, to a portable shaving apparatus designed to look like a cosmetic container such as a lipstick case, make-up case or make-up applicator case.

SUMMARY OF THE INVENTION

In one embodiment, the present invention relates to a portable shaving apparatus comprising: a central component having opposing ends, a first top end comprising a removable attachment and a second bottom end having an exposed cavity, the exposed cavity designed to receive a power source; a first removable, external component designed to attach to a portion of the central component and cover the cavity; and a second removable, external component designed to cover the attachment, and the second external component is designed to attach to a portion of the central component and when in a closed position, and the apparatus is designed to look like a cosmetic container.

In another embodiment, the apparatus further comprising a motor, and the motor is situated within said first top end of said central component. In yet another embodiment, the apparatus further comprising a power source, and the power source is a battery including rechargeable batteries.

In still another embodiment, the attachment is selected from a group consisting essentially of a rotary blade, a shaving blade, a trimmer, a brush, a buffer, a pumice, a rotary cleaning device, an exfoliating device, a make-up brush, a make-up remover and combinations thereof.

In still yet another embodiment, the apparatus is from about one inch to about four inches long or tall.

In a further embodiment, the cosmetic container is selected from a group consisting essentially of a lipstick case, an applicator case, a makeup case and combinations thereof. In a further embodiment, the external component of said apparatus has a cross section, and the cross section has a shape selected from a group consisting essentially of oval, ellipse, eye-shaped, oblong and combinations thereof.

In still a further embodiment, the apparatus further comprising at least one light. In yet a further embodiment, the light is designed to illuminate target area of a user's body. In still yet a further embodiment, the light is a flashlight situated on at least one of the external components.

In another further embodiment, the apparatus further comprising an on/off switch situated on said central component.

In another further embodiment, the second external component comprises a closed top end and an opened bottom end, and the bottom end of the second external component having at least one protrusion, and the protrusion designed to align with said on/off switch and shut off said apparatus in the closed position.

In another further embodiment, the second external component comprises a closed top end and an opened bottom end, and the bottom end of the second external component having at least one protrusion, the protrusion designed to align with said on/off switch and shut off the apparatus in said closed position. In still another embodiment, the second external component is self-aligning with the first external component.

In yet another embodiment, the central component comprises a storage compartment. In still yet another embodiment, at least one of the external components comprises a storage compartment.

In a further embodiment, the apparatus further comprising a shaft coupled to the motor, the shaft is an elongated polygon configured to interface with the attachment.

In another further embodiment, the apparatus further comprising a mirror.

In a further embodiment, the present invention provides for a portable shaving apparatus comprising: a central element having opposing ends, a first top end comprising a removable attachment and a second bottom end having an internal cavity, the internal cavity designed to receive a power source; a first removable bottom cap designed to attach to a portion of the central element and cover at least a portion of the bottom end of the central element; and a second removable top cap designed to cover the attachment, the second cap is designed attach to a portion of the central element and when in a closed position, and the apparatus is designed to look like a cosmetic container.

In a further embodiment, the apparatus further comprises a motor, a shaft, a power source and at least one storage compartment.

In another further embodiment, the present invention provides for a portable shaving apparatus comprising: a central component having opposing ends, a first top end comprising a removable shaving device and a second bottom end having an exposed cavity, the exposed cavity designed to receive a power source; a first removable, external component designed to attach to a portion of the central component and cover the cavity; and a second removable, external component designed to cover the shaving device, and the second external component is designed attach to a portion of the central component and when in a closed position, the apparatus is designed to look like a cosmetic container.

BRIEF DESCRIPTION OF THE DRAWINGS

The accompanying drawings are included to provide a further understanding of the present invention. These drawings are incorporated in and constitute a part of this specification, illustrate one or more embodiments of the present invention and together with the description, serve to explain the principles of the present invention.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Figure 1:
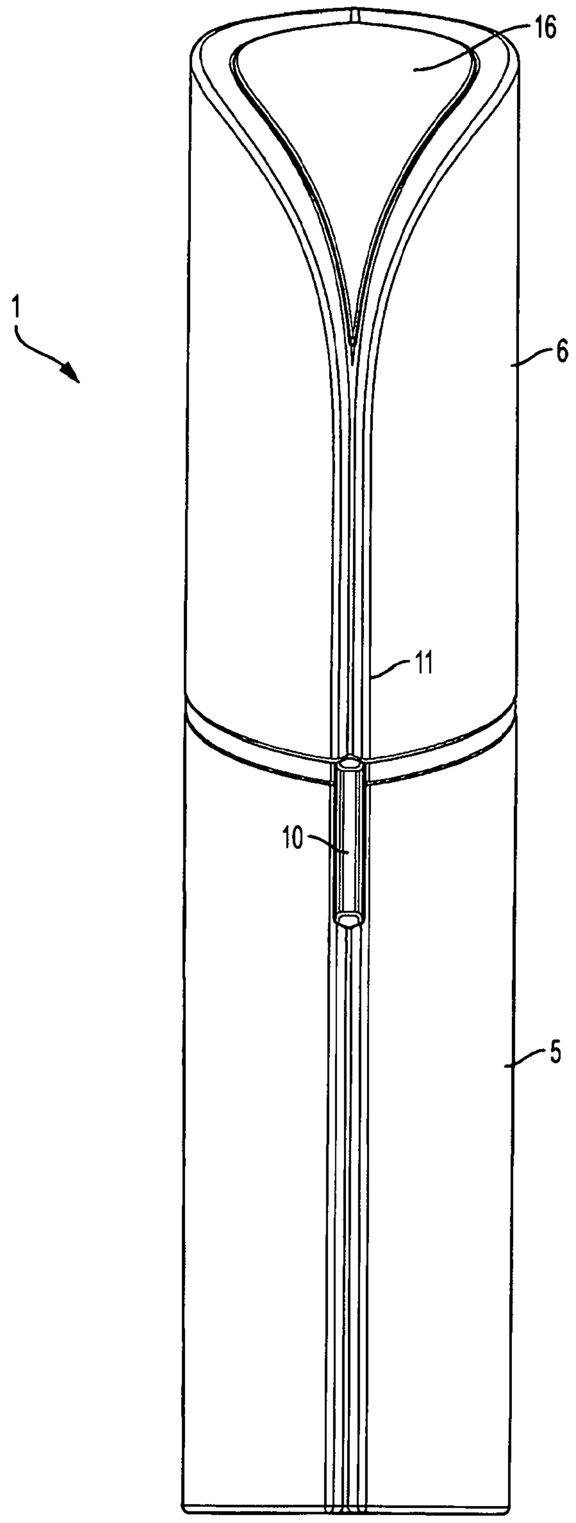
FIG. 1 is a front view of one of the embodiments of the present invention.

FIG. 1 illustrates the shaving apparatus 1 having a first removable external structure 5, a second external removable structure 6 (cover), an on/off switch 10, a protrusion 11 on the second removable external component 6, and a mirror 16. The mirror 16 on the second removable component 6 can be used to assist a user in using the shaving apparatus, in applying a cosmetic product, or in performing a cosmetic task.

FIG. 1 further shows a portable shaving apparatus 1 that when in a closed position looks like a cosmetic container. The user would normally not shave in public furthermore carry a shaving device. The present invention allows for discretion and the ability to disguise the shaving device to look like a lipstick or cosmetic applicator. The cosmetic container that contains the shaving apparatus 1 is from about one inch to four inches long. The cosmetic container can be selected from a group consisting essentially of a lipstick case, an applicator case, a makeup case and combinations thereof. The on/off switch 10 can be used directly by the user to power the device on or off. The second external component 6 having at least one protrusion 11, the protrusion 11 is designed to self-align with the on/off switch 10 and with the first external component 5. The second external component 6 self-aligns with said first external component 5, meaning that when a user places the second external component 6 on the shaving apparatus 1 after each use, the second external component automatically aligns to the correct position for securely storing the shaving apparatus 1. The self-aligning nature of the second external component 6 ensures that when it is placed on the shaving apparatus 1 that the device is shut off for storage therefore not wasting any battery life. The self-aligning nature of the second external component 6 means that the user in one action can cover the device for storage and shut the device off.

Figure 2:
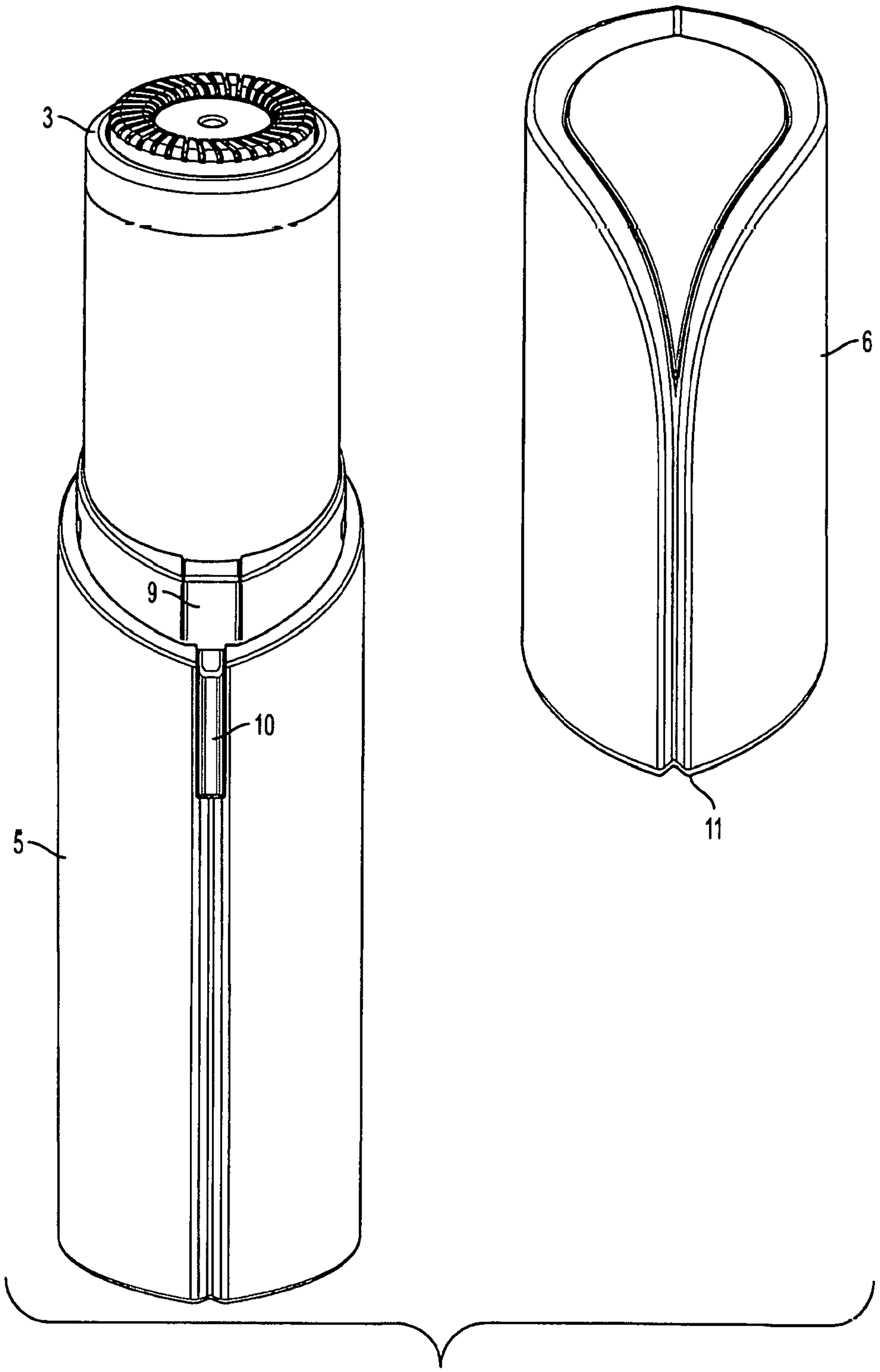
FIG. 2 is a front view of FIG. 1 showing second removable external component removed of one of the embodiments of the present invention.

FIG. 2 illustrates the shaving apparatus 1 having a removable attachment 3, a first removable external structure 5, a second external removable structure 6, a light 9, an on/off switch 10, a protrusion 11 on said second removable external component 6. The light 9 of the shaving apparatus illuminates the target area to be shaved on the human body. The shaving apparatus can also have a light that acts as a flash light on the first removable external structure 5. The light and the flashlight can be powered by the same power source that powers the motor. The light and the flashlight could also be powered by a separate power source dedicated to the lights. The compact size of the shaving apparatus 1 with a flashlight makes for a convenient light source that is easily stored in a pocket in clothing, a purse, backpack, or briefcase. The removable attachment 3, allows a user to take the attachment off of the device to clean the attachment after each use to prevent debris from building up in the attachment, this helps prevent unnecessary stress on the removable attachment 3, as well as the other components of the shaving apparatus 1. FIG.2 further shows a central component 2 having opposing ends, a first top end comprising a removable attachment 3, the removable attachment 3 can be selected from components such as a rotary blade, a shaving blade, a trimmer, a brush, a buffer, a pumice, a rotary cleaning device, an exfoliating device, a make-up brush, a make-up remover and combinations thereof. The removable attachment 3 can be removably secured to the shaving apparatus to allow a secure fir during operation and storage, however, still allowing the user to take the removable attachment 3 off of the shaving apparatus 1 to either clean the attachment or place a different attachment on which has a different function. The removable attachment 3 can be connected to the device using a variety of methods such as clips, magnets, a twist-lock mechanism, corresponding detents and protrusions, press fitting, and combinations thereof.

Figure 3:
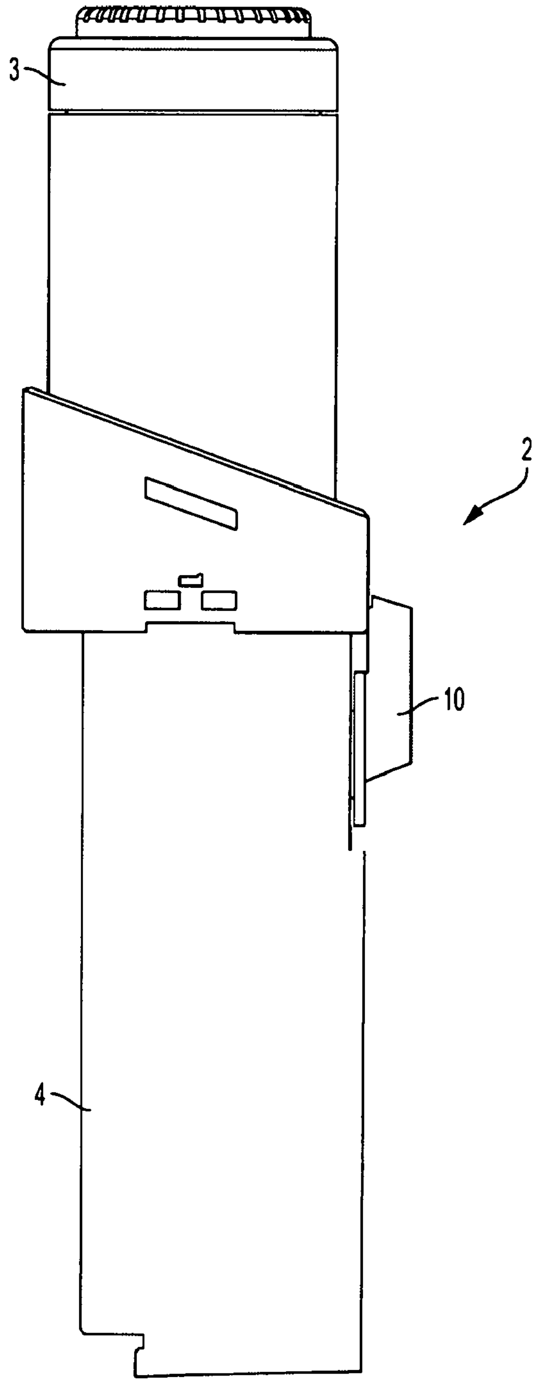
FIG. 3 is a perspective view of the central component of one of the embodiments of the present invention.
Figure 4:
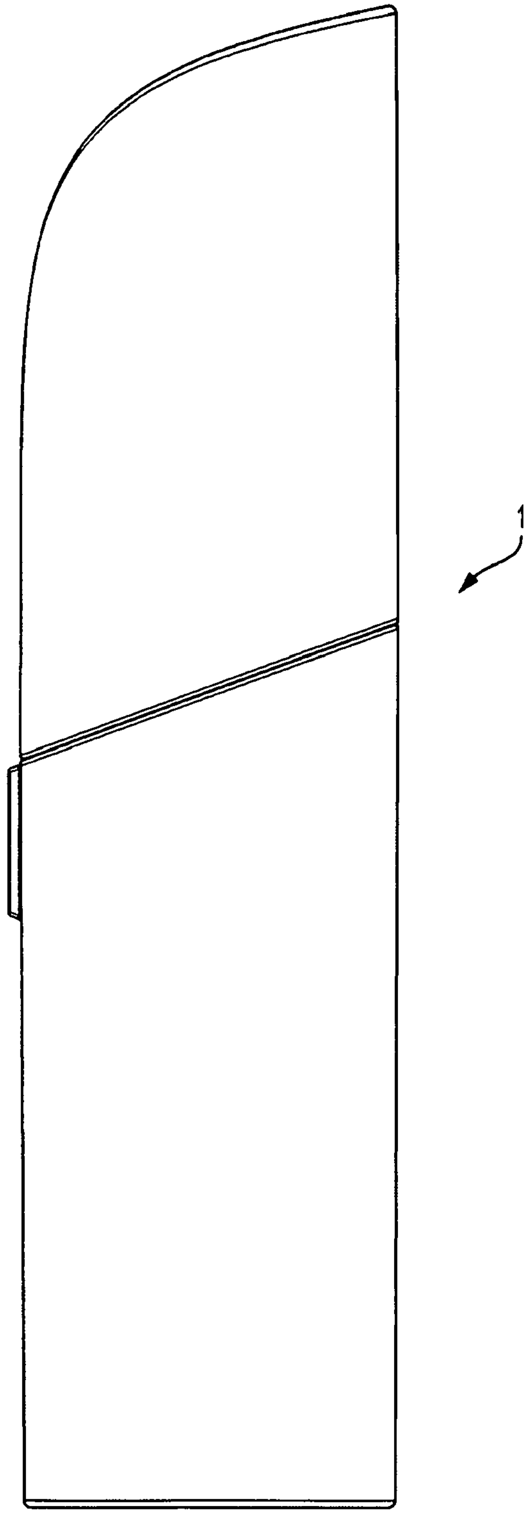
FIG. 4 is a side view of one of the embodiments of the present invention.

FIG. 3 illustrates the central component 2 of the shaving apparatus 1, having a removable attachment 3, a cavity 4, and an on/off switch 10. The central component 2 also has a second bottom end having an exposed cavity 4, said exposed cavity 4 is designed to receive a power source. The power source drives the motor. The central component 4 is capable of having a storage compartment in the shaving apparatus 1. The storage compartment can store different types of accessories such as the various removable attachments 3 (which can be a rotary blade, a shaving blade, a trimmer, a brush, a buffer, a pumice, a rotary cleaning device, an exfoliating device, a make-up brush, a make-up remover and combinations thereof), a cleaning brush, a tweezers, a cosmetic product, extra batteries, or similar items. FIG. 4 is a side perspective view of shaving apparatus 1.

Figure 5:
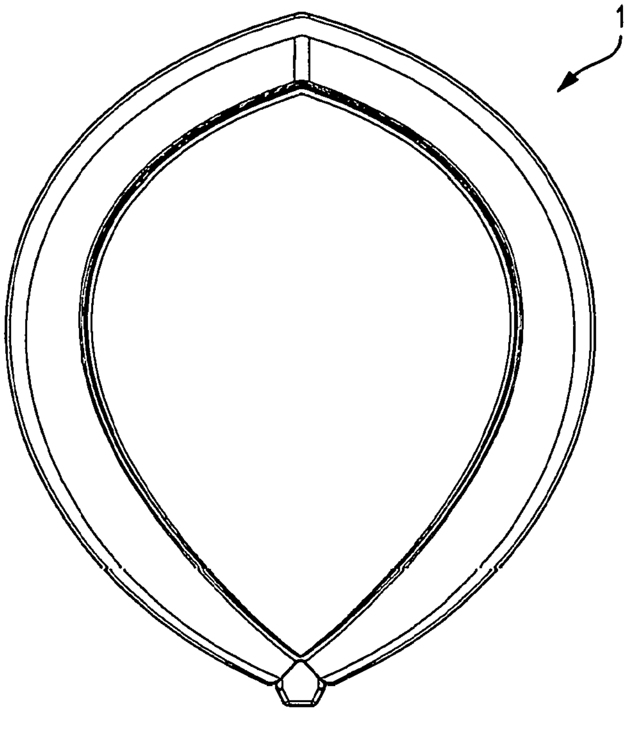
FIG. 5 is a top view of one of the embodiments of the present invention.

FIG. 5 is a top perspective view of shaving apparatus 1. The top view of the shaving apparatus shows a cross sectional shape of the shaving apparatus 1. The cross sectional shape of the shaving apparatus in FIG. 5 is eye-shaped. The cross section can be a shape selected from a group consisting essentially of oval, ellipse, eye shaped, oblong and combinations thereof. The cross sectional shape of the shaving apparatus 1 aids in the self-aligning nature of the second external component 6.

Figure 6:
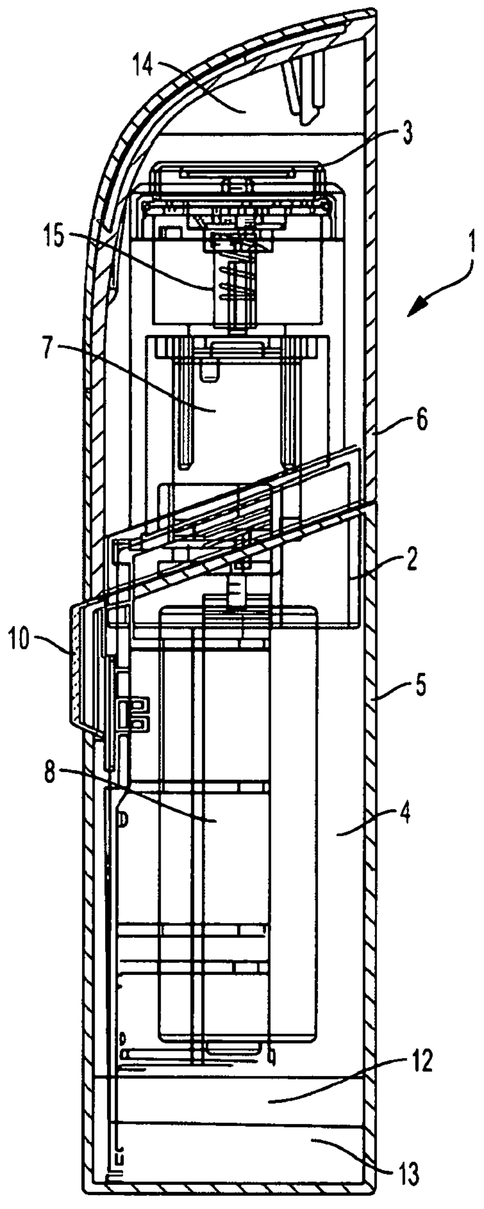
FIGS. 6-7 are side views of the internal structure of one of the embodiments of the present invention.
Figure 7:
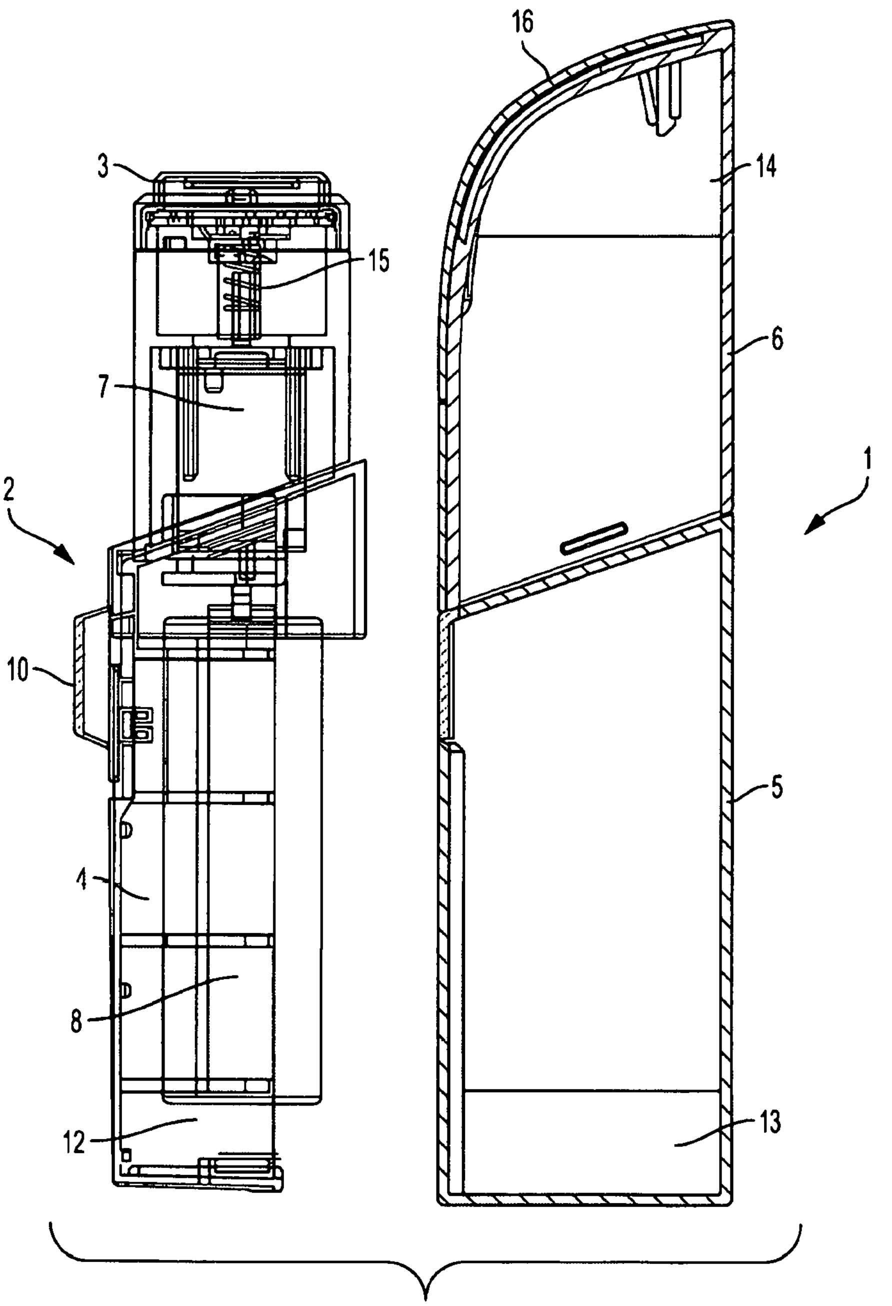

FIGS. 6-7 illustrate the shaving apparatus 1 having a central component 2, a removable attachment 3, a cavity 4 of the central component 2, a first removable external structure 5, a second external removable structure 6, a motor 7, a power source 8, an on/off switch 10, a storage compartment 12 of the central component 2, a storage compartment 13 of first removable external structure 5, and a storage compartment 14 of second removable external structure 6. There is a shaft that extends from the motor 7, the shaft can have an elongated polygonal configuration designed to securely interface with the removable attachment 3. The shaft transfers the motion from the motor 7 to the removable attachment 3. The polygonal shape of the shaft corresponds to the shape of the receiving component that is located underneath the removable attachment 3. The complimentary shapes of the shaft and the removable attachment allows the removable attachment 3 to securely connect in order to move the removable component 3 as the motor spins the shaft, thus the shaft is acting a like transmission transferring power from the motor 7 to the removable component 3. The motor 7 is powered by the power source 8. The power source 8 can be either be an internal rechargeable battery that does not have to be removed to be charged. The power source 8 can also be a removable battery (that is either disposable or rechargeable).

Numerous modifications and variations of the present invention are possible in light of the above teachings. It is therefore to be understood that within the scope of the attendant claims attached hereto, this invention may be practiced otherwise than as specifically disclosed herein.

What is claimed is:

1. An article comprising a shaving device arranged to look like a cosmetic container, the shaving device comprising:

a first external component;

an on/off switch to power the shaving device on and off; and a second external component having at least one protrusion and being configured to self-align with the first external component and the on/off switch;

wherein, when the second external component is placed on the shaving device, the shaving device is covered for storage, and the device is shut off.

2. The article of claim 1, wherein the shaving device arranged to look like cosmetic container has a length of about 1 to about 4 inches.

3. The article of claim 1, wherein the cosmetic container is selected from the group consisting of a lipstick case, an applicator case, a makeup case, and combinations thereof.

4. A shaving apparatus comprising:

a removable attachment;

a first removable external structure;

a second removable external structure;

a light;

an on/off switch; and a protrusion on the second removable external structure.

5. The shaving apparatus of claim 4, wherein the light is arranged to illuminate a target area to be shaved on a human body.

6. The shaving apparatus of claim 5, further comprising a flashlight on the first removable external structure.

7. The shaving apparatus of claim 4, further comprising a power source and a motor.

8. The shaving apparatus of claim 4, further comprising a central component having a top end to which the removable attachment is removably attached.

9. The shaving apparatus of claim 4, wherein the removable attachment is selected from the group consisting of a rotary blade, a shaving blade, a trimmer, a brush, a buffer, a pumice, a rotary cleaning device, an exfoliating device, a make-up brush, a make-up remover, and combinations thereof.

10. A portable shaving apparatus comprising:

a central component having a removable attachment, an on/off switch, an exposed cavity designed to receive a power source, and a motor that is driven by the power source;

wherein the removable attachment is selected from the group consisting of a rotary blade, a shaving blade, a trimmer, a brush, a buffer, a pumice, a rotary cleaning device, an exfoliating device, a make-up brush, a make-up remover, and combinations thereof.

11. The portable shaving apparatus of claim 10, wherein the central component further comprises a storage compartment.

12. The portable shaving apparatus of claim 11, wherein the storage compartment stores one or more of a cleaning brush, a tweezer, a cosmetic product, and batteries.

13. The portable shaving apparatus of claim 11, wherein the storage compartment stores one or more of the removable attachment.

14. A shaving apparatus comprising:

a central component;

a removable attachment;

a cavity of the central component;

a first removable external structure;

a second external removable structure;

a motor; and a power source.

15. The shaving apparatus of claim 14, further comprising a shaft that extends from the motor to interface with the removable attachment.

16. The shaving apparatus of claim 14, wherein the power source is a rechargeable battery.

17. The shaving apparatus of claim 14, wherein the power source is a removable battery that is either disposable or rechargeable.

18. The shaving apparatus of claim 14, further comprising at least one storage component.

* * * * *